Oct. 26, 1965        E. S. GANDRUD        3,213,698
DRIVE MECHANISM FOR AGRICULTURAL IMPLEMENTS
Filed June 11, 1962        4 Sheets-Sheet 2
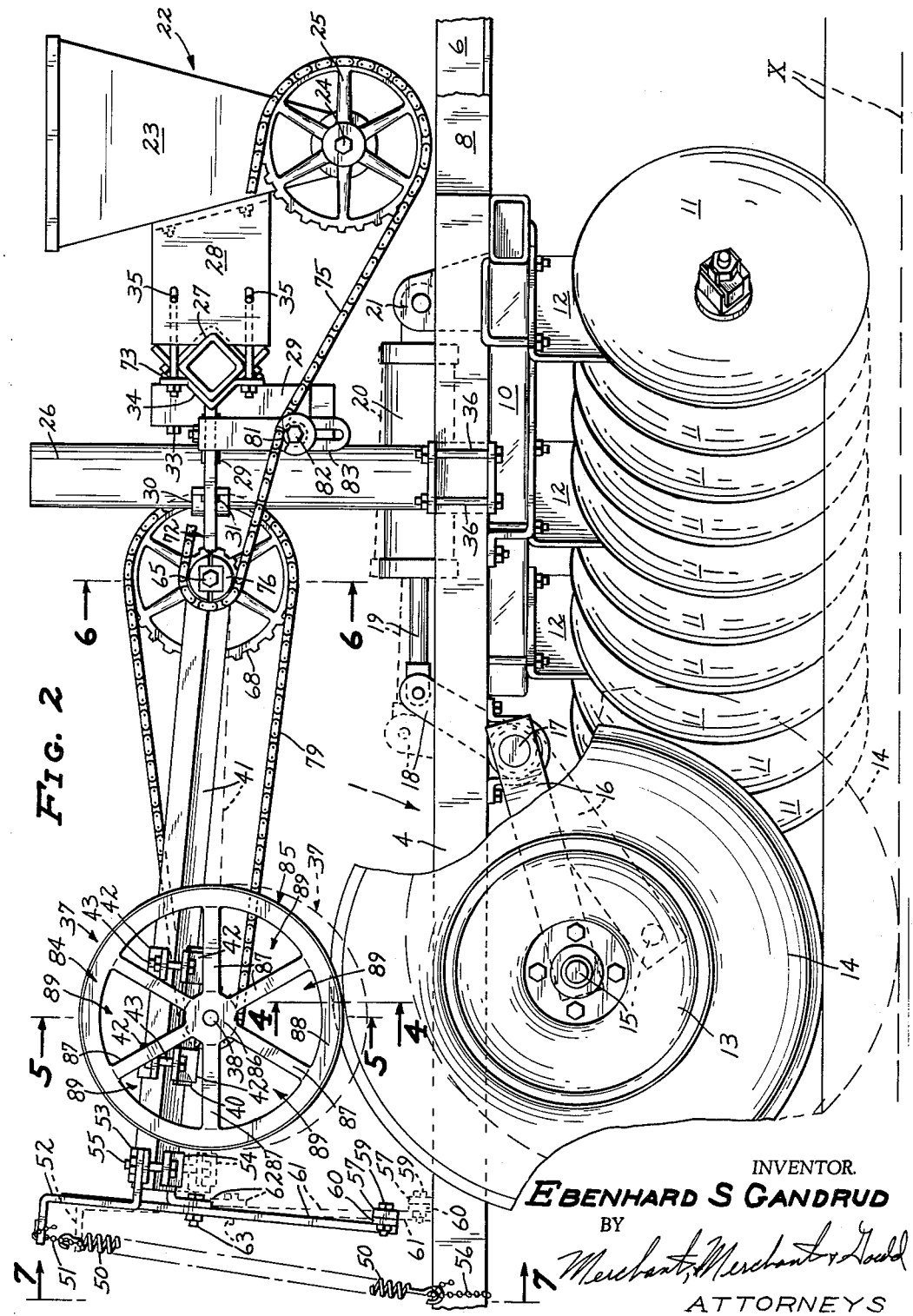
INVENTOR.
*EBENHARD S GANDRUD*
BY
*Merchant, Merchant & Gould*
ATTORNEYS

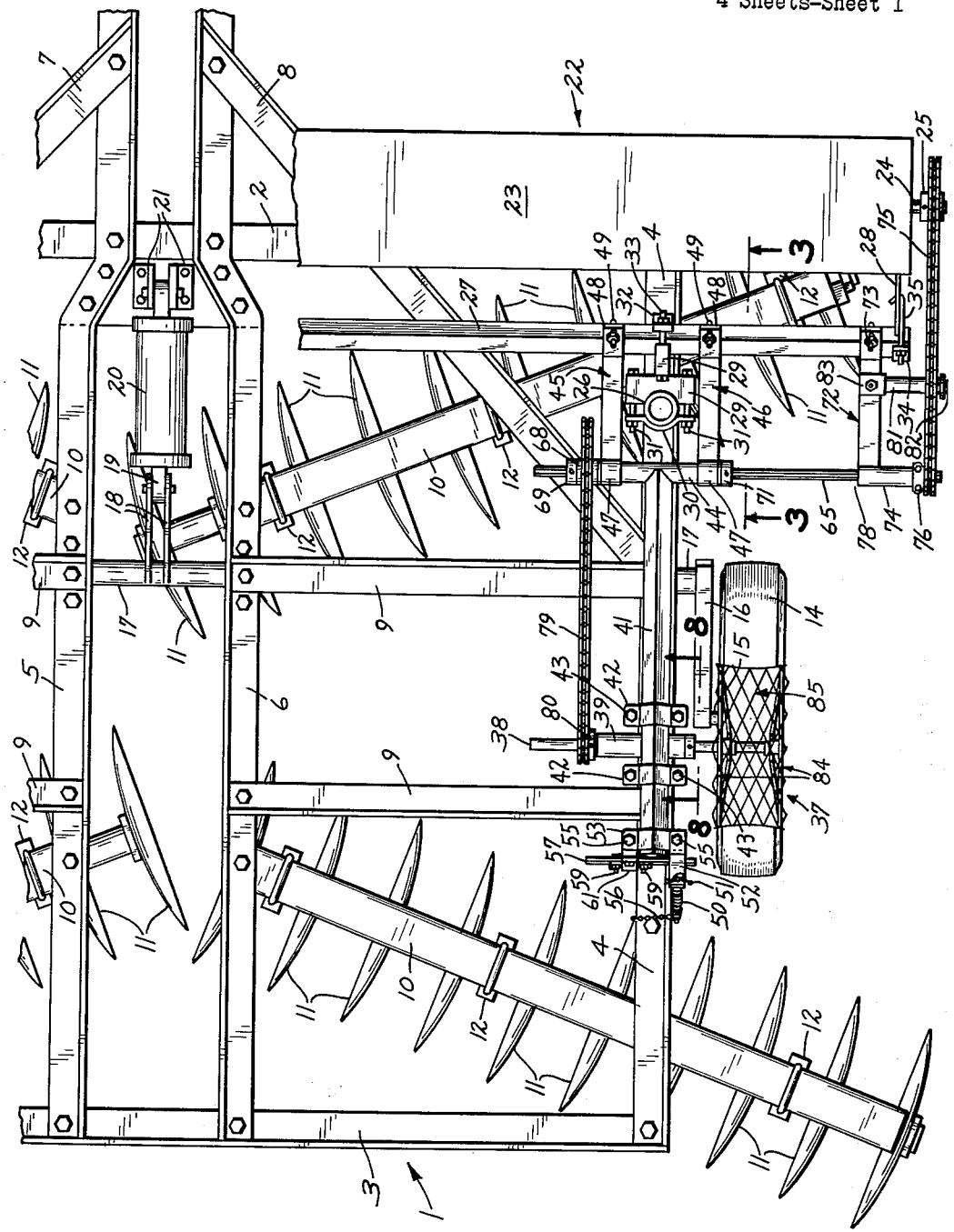

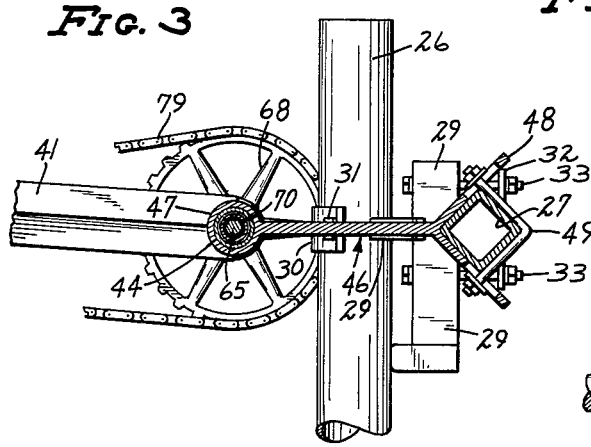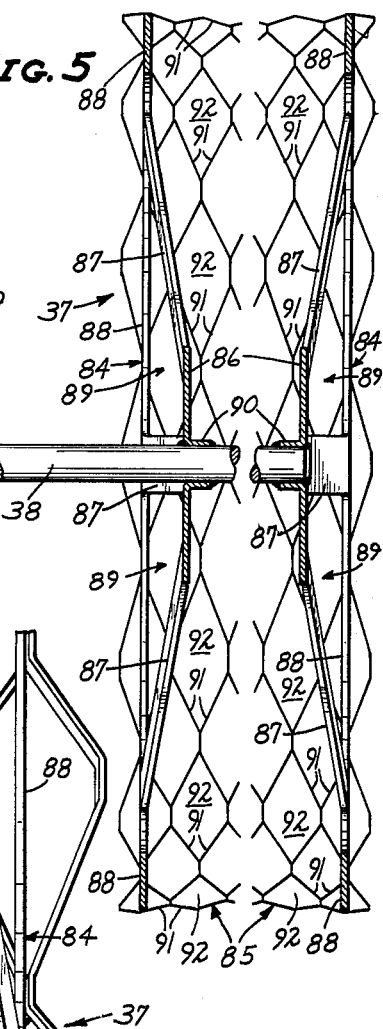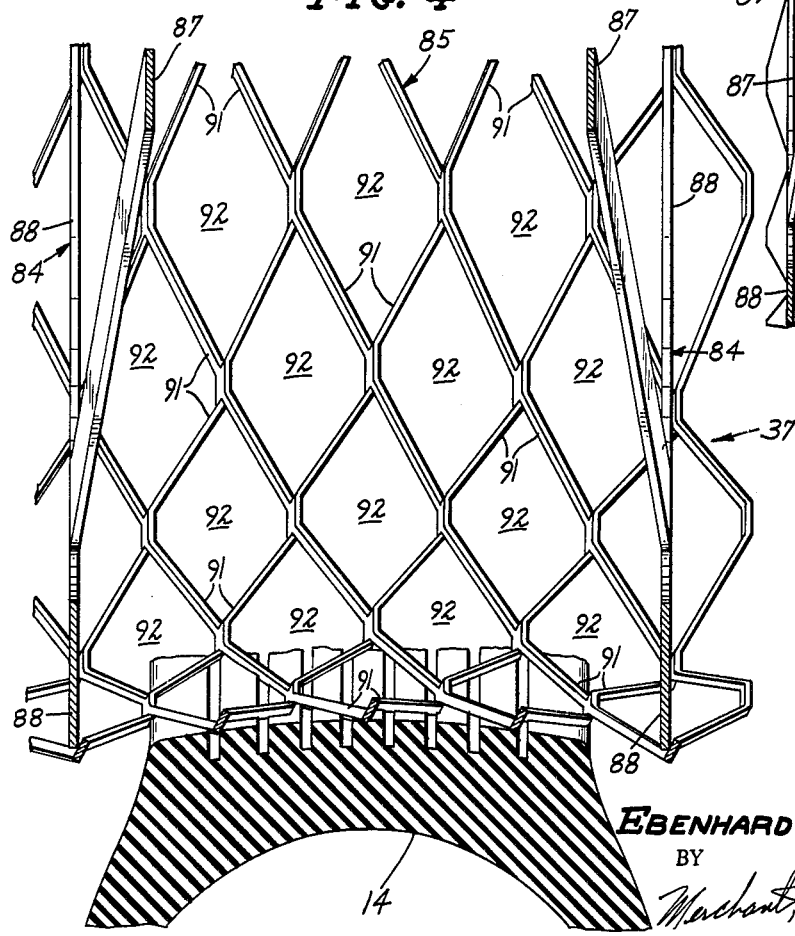

Oct. 26, 1965 E. S. GANDRUD 3,213,698
DRIVE MECHANISM FOR AGRICULTURAL IMPLEMENTS
Filed June 11, 1962 4 Sheets-Sheet 4
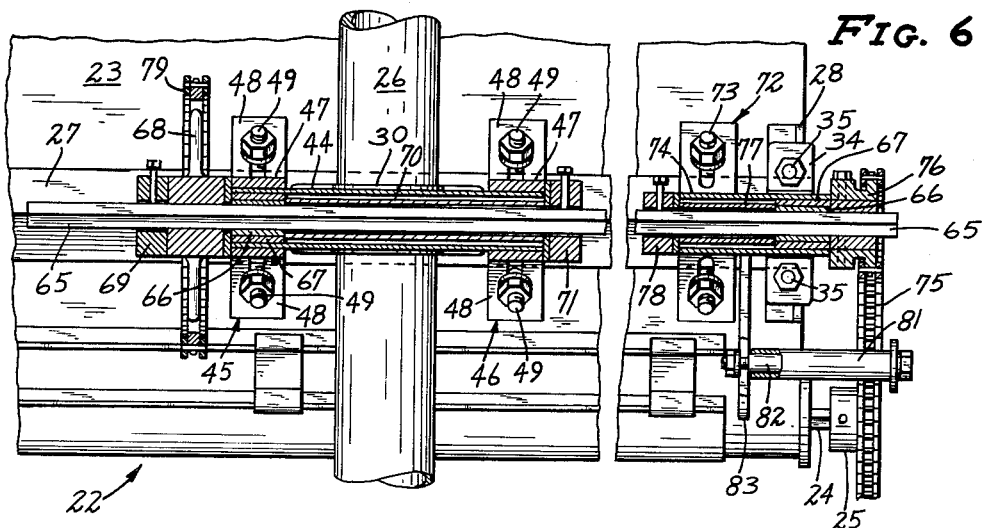
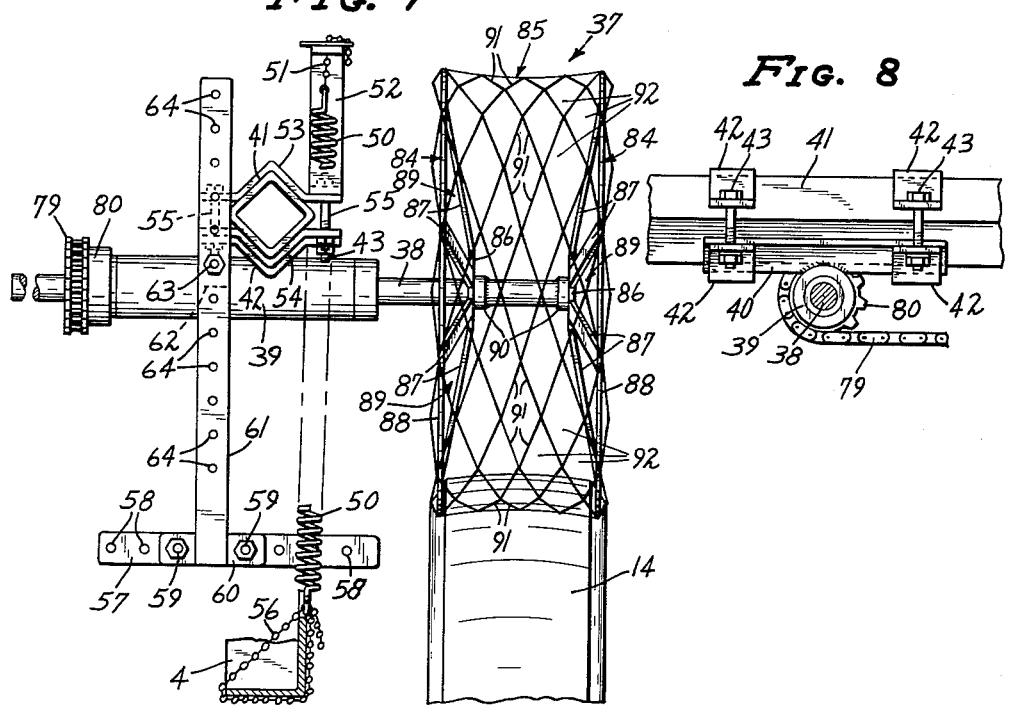
INVENTOR.
*EBENHARD S. GANDRUD*
BY
*Merchant, Merchant & Gould*
ATTORNEYS

United States Patent Office 3,213,698
Patented Oct. 26, 1965

3,213,698
DRIVE MECHANISM FOR AGRICULTURAL
IMPLEMENTS
Ebenhard S. Gandrud, c/o Gandy Company, 100 Gandrud
Road, Owatonna, Minn.
Filed June 11, 1962, Ser. No. 201,614
4 Claims. (Cl. 74—206)

My present invention relates generally to agricultural implements, and more particularly to means for driving rotary elements from the ground-engaging supporting wheels of mobile implements.

More specifically, my invention relates to improvements in drive wheel construction for operating auxiliary apparatus from the pneumatic tire equipped supporting wheel of a mobile implement.

It is recognized that drive wheels, generally, have been used heretofore for the purpose of employing the frictional engagement thereof with a ground driven supporting wheel, to operate mechanisms of various types. In order to obtain sufficient traction between the supporting wheel and the drive wheel engaged thereby to drive movable parts such as, for instance, rotary agitators and feeding mechanisms in granular material distributing devices or the like, various types of surfaces have been used on the tire engaging drive wheels, such as toothed, corrugated, and even smooth surfaces shaped to conform generally to the convex crown surface of a tire on the supporting wheel of the implement. Ordinarily, when the ground is relatively dry, such surfaces provide sufficient traction to operate movable parts of the associated devices. However, when the ground is wet, or even moist, it tends to adhere to the tires of the supporting wheels and quickly fills spaces between the teeth or corrugations of such drive wheels, and traction is lost or reduced to a point where proper operation of the driven mechanism no longer exists. An important object of my invention is, therefore, the provision of a drive mechanism involving a drive wheel which maintains driving traction with the tire of a cooperating supporting wheel irrespective of the moisture content of the ground and without regard to the amount of earth accumulating on the tire of the engaged supporting wheel of the implement.

Another object of my invention is the provision of a drive mechanism, as set forth, having a tire engaging drive wheel which operates to remove earth from the surface of the tire engaged thereby as the implement supporting wheel and drive wheel rotate.

Another object of my invention is the provision of a drive wheel, as set forth, in which earth gathered thereby from the tire of the supporting wheel is automatically removed therefrom during rotation thereof.

To the above ends, I provide a drive wheel comprising a pair of axially spaced flanges and an open latticed rim, the flanges each having hub portions, widely circumferentially spaced radial spokes and annular ring portions connecting the outer ends of the spokes, the rim defining relatively large generally diamond shaped openings for free passage of earth and other material therethrough to the hollow interior of the drive wheel, from whence the earth and other material escape axially outwardly through the relatively large segmental openings defined by the spokes of said flanges.

Another object of my invention is the provision of a drive wheel of the above type, in which the open latticed rim comprises relatively narrow generally diagonally extending interconnected portions which define said generally diamond shaped openings, and which cut easily through the accumulated earth on the tire, whereby to engage the thread material of the tire with adequate traction to drive the devices associated therewith.

Still another object of my invention is the provision of novel means for mounting a drive wheel as set forth, whereby the same is adapted for use with various types of mobile agricultural implements. Another object of my invention is the provision of drive mechanisms of the type set forth, which is relatively simple and inexpensive to produce, which is highly efficient in operation, and which is rugged in construction and durable in use.

The above and still further highly important objects and advantages of my invention will become apparent from the following detailed specification, appended claims, and attached drawings.

Referring to the drawings, which illustrate the invention, and in which like reference characters indicate like parts throughout the several views:

FIG. 1 is a fragmentary view in top plan of a mobile agricultural implement having an auxiliary implement mounted thereon and showing the drive mechanism of my invention;

FIG. 2 is an enlarged fragmentary view in side elevation;

FIG. 3 is a still further enlarged fragmentary view, partly in side elevation and partly in section, taken substantially on the line 3—3 of FIG. 1;

FIG. 4 is a greatly enlarged fragmentary section taken substantially on the line 4—4 of FIG. 2;

FIG. 5 is an enlarged fragmentary section taken substantially on the line 5—5 of FIG. 2;

FIG. 6 is an enlarged fragmentary detail, partly in section and partly in rear elevation, taken on the line 6—6 of FIG. 2;

FIG. 7 is an enlarged detail partly in section and partly in rear elevation, taken substantially on the line 7—7 of FIG. 2, some parts being broken away; and FIG. 8 is an enlarged fragmentary section taken substantially on the line 8—8 of FIG. 1.

Referring with greater detail to the drawings, the numeral 1 indicates, in its entirety, the frame of a mobile agricultural implement which, for the purpose of the present example, is in the nature of a conventional tandem disk harrow. The frame 1 comprises a pair of front and rear cross frame members 2 and 3 respectively that are connected by side frame members 4, one of which is shown, and spaced parallel intermediate frame members 5 and 6 that extend forwardly from the front frame member 2, and which are braced by diagonal frame members 7 and 8. Intermediate cross frame members 9 connect the side frame members 4 with the intermediate frame members 5 and 6, the frame 1 having mounting bars 10 thereon for mounting gangs of disk harrows 11 by means of depending plate-like elements 12, in the usual manner.

Supporting wheels 13, one of which is shown, are provided with pneumatic tires 14, one of which is shown, and are disposed at opposite sides of the frame 1 for supporting the implement for transport. Each of the wheels 13 is journalled on a stub shaft 15 at the rear end of a different one of a pair of trailing arms 16 that are rigidly secured at their front ends to a cross shaft 17 suitably mounted on the frame 1 for rocking movements in directions to raise or lower the wheels 13 relative to the frame 1. As its central portion, the transverse shaft 17 is provided with a generally upwardly extending crank arm 18 to the upper end of which is pivotally secured a piston rod 19 that extends rearwardly from a cooperating fluid pressure cylinder 20 that is pivotally mounted at its front end between a pair of brackets 21 carried by the intermediate frame members 5 and 6 adjacent the front frame member 2. The cylinder 20 is adapted to receive fluid under pressure from a suitable source, not shown, to impart rocking movements to the transverse shaft 17. As shown in FIG. 2, the wheels 13 may be moved relative to the frame 1 upwardly so that the disk harrows are permitted to penetrate into the ground below the level therof, indicated at X. Downward bodily movement of the wheels 13 relative to the frame 1 causes the disk harrows 11 to be raised out of engagement with the ground, as indicated by dotted lines in FIG. 2, so that the implement may be moved readily over a highway or the like. It may be assumed that front ends of the intermediate frame members 5 and 6 are provided with a hitch element, not shown, but by means of which the implement may be attached to a tractor or the like, not shown. Inasmuch as the implement does not, in and of itself, comprise the instant invention, further detailed showing and description thereof is not deemed necessary. Hence, in the interest of brevity, such further showing and description is omitted.

In order to illustrate the purpose of my present invention, an auxiliary implement, indicated generally at 22, is shown as being carried by the frame 1. For the purpose of the present example, the implement 22 is in the nature of a distributor for granular material such as fertilizer or other chemicals for destroying insects, weeds and the like. One type of such implement is disclosed in my prior United States Letters Patent 2,723,053, and involves a hopper and an agitator and feeding rotor, and means for imparting rotation to the rotor. The implement 22 as shown in FIGS. 1 and 2 comprises a hopper 23, a rotary shaft 24 extending outwardly from one end of the hopper 23, and a sprocket wheel 25 mounted fast upon the extended end of the rotor shaft 24. Means for mounting the hopper 23 on the frame 1 comprises a pair of upright posts 26, a transversely extending cross-sectionally rectangular tool bar 27 and a plurality of brackets 28 one each rigidly secured to the hopper 23 adjacent the opposite ends thereof and at spaced points intermediate said opposite ends. The tool bar 27 is vertically adjustably mounted on the posts 26 by means of mounting elements 29, clamping bars 30, and nut-equipped clamping screws 31. The mounting elements 29 are notched to engage the tool bar 27 opposite clamping bars 32 which are secured thereto by nut-equipped bolts or studs 33. Other clamping bars 34 engage the tool bar 27 opposite the brackets 28 and are secured to the brackets 28 by nut-equipped hooked studs 35. The posts 26 are bolted or otherwise rigidly secured to the side frame members 4, as indicated at 36 in FIG. 2. It will be noted that only one of the mounting posts 26, brackets 28 and mounting elements 29, together with parts associated therewith, are shown; and it may be assumed that the opposite end portion of the hopper is supported from the side frame member, not shown, in the same manner as illustrated in FIGS. 1 and 2.

Means for imparting rotation to the rotor shaft 24 includes one of the pneumatic tires 14 of the supporting wheels 13, and other mechanism now to be described. It will be appreciated that the tires 14 are maintained in contact with the ground at all times during the operation of the disks 11, and serve as means for controlling the depth of penetration of the disks 11 into the ground. With reference to FIG. 2, it will be noted that the ground surface X is shown in two positions as indicated by full and dotted lines. This is done only to simplify the illustration of operative and inoperative positions assumed by the frame 1 and parts carried thereby in the drawing. A drive wheel, indicated in its entirety by the numeral 37, is rigidly mounted on a drive shaft 38 that is journalled in a bearing 39 for rotation on a horizontal axis parallel to the axis of the supporting wheels 13. The bearing 39 is welded or otherwise rigidly secured to a V-shaped saddle 40 that is rigidly but longitudinally adjustably mounted to a generally forwardly and rearwardly extending arm 41, by means of clamping bars 42 and cooperating nut-equipped clamping bolts or the like 43, see particularly FIGS. 7 and 8. At its front end, the arm 41 is welded or otherwise rigidly secured to the central portion of a transversely extending generally horizontally disposed tubular member 44, that is supported from the tool bar 27 by a pair of laterally spaced parallel mounting bars 45 and 46 disposed at opposite sides of the post 26 extending upwardly from the side frame member 4. As shown particularly in FIG. 6, the rear ends of mounting bars 45 and 46 are formed to provide tubular bearings 47 which journal opposite end portions of the tubular member 44. At their front ends, the mounting bars 45 and 46 are bifurcated to form V-shaped jaws 48 which engage adjacent sides of the tool bar 27 and which are slotted to receive adjacent nut-equipped screw threaded ends of cooperating V-shaped clamping studs 49, see particularly FIGS. 3 and 6.

The drive wheel 37, together with the arm 41, is gravity biased in a downward direction toward engagement of drive wheel 37 with the road-engaging crown surface of the pneumatic tire 14, the gravity bias being aided by a coil tension spring 50 that is secured at its upper end, by means of a link chain 51, to the upper end of an upstanding bracket 52 that is rigidly secured to one of a pair of clamping bars 53 and 54 mounted on the rear free end of the arm 41 by means of nut-equipped clamping screws or the like 55. The opposite or lower end of the spring 50 is secured to a convenient portion of the frame member 4 by means of a link chain or the like 56, see particularly FIGS. 1, 2 and 7. Means for limiting downward spring biased movement of the arm 41 and driving wheel 37, carried thereby, comprises a horizontally disposed transverse stop bar 57 which engages an underlying portion of the frame member 4. The stop bar 57 is provided with a plurality of longitudinally spaced apertures 58 for selective reception of nut-equipped screws or the like 59 which extend through suitable openings in a cross member 60 at the lower end of a generally vertically disposed elongated member 61 that is rigidly secured to an anchoring lug 62 by means of a nut-equipped bolt 63. The anchoring lug 62 is rigidly secured to the clamping bar 54 by one of the nut-equipped clamping bolts 55, the anchoring screw or bolt 63 being adapted to be received in any selected one of a plurality of longitudinally spaced apertures 64 in the member 61, whereby the limit of downward movement of the arm 41 and parts carried thereby, may be adjusted.

A cross sectionally polygonal jackshaft 65 extends axially through the tubular member 44 in parallel relationship to the axis of the drive shaft 38, and has mounted thereon a bushing 66 that is journalled in a sleeve bearing 67 mounted in the tubular member 44, radially inwardly of the bearing 47 of the mounting bar 45. A relatively large diameter sprocket wheel 68 is mounted on the jackshaft 65 adjacent the mounting bar 45 and is held against axial movement in a direction away from the mounting bar 45 by a set screw equipped stop collar 69 locked to the jackshaft 65, see particularly FIG. 6. Inwardly of the tubular member 44, a spacing sleeve 70 encompasses the jackshaft 65, one end thereof abutting the bushing 66 and the other abutting a washer and set screw equipped stop collar 71 adjacent the bearing 47 of the mounting bar 46, the collar 69 and 71 and tubular spacer 70 locking the jackshaft 65 against axial movement relative to the mounting bars 45 and 46. A mounting bar 72 similar to the mounting bars 45 and 46 is rigidly but longitudinally adjustably mounted on the tool bar 27, as indicated at 73, and extends rearwardly from the tool bar 27, the rear end of the mounting bar 72 having welded thereto a horizontally disposed tubular element 74 that is axially aligned with the tubular member 44, see particularly FIGS. 1 and 6. At one end portion of the tubular element 74, the jackshaft 65 is provided with a second bushing 66 that is journalled in a second sleeve bearing 67 that is press fitted or otherwise rigidly secured within the tubular element 74. An endless link chain 75 is entrained over the sprocket wheel 25 and another sprocket wheel 76 mounted fast on the jackshaft 65 adjacent one end of the tubular member 74. As shown in FIG. 6, the bushing 66 within the tubular element 74 abuts the sprocket wheel 76 at one end, and at its other end abuts a tubular spacer 77 that extends to the other end of the tubular member 74, having abutting engagement with a washer and set screw equipped stop collar 78. A second endless link chain 79 is entrained over the sprocket wheel 68 and over a relatively small diameter drive sprocket 80 rigidly mounted on the drive shaft 38. An idler roller 81 engages a flight of the endless link chain 75 to take up undue slack which may occur therein, and is journalled on a spindle 82 that is adjustably mounted on a bracket member 83 secured to the mounting bar 72, see particularly FIGS. 2 and 6.

The drive wheel 37, which is an important feature of my invention, comprises a pair of axially spaced flanges 84, preferably stamped from flat sheet metal, and an open latticed rim 85. The flanges 84 each comprise a central hub portion 86, a plurality of widely spaced radial spokes 87, and an annular ring portion 88 which cooperates with the spokes 87 to define relatively large segmental openings 89. As shown in FIG. 5, the hub portions 86 are formed to provide inturned flanges 90 that are welded or otherwise rigidly secured to the drive shaft 38 for common rotation therewith. In the embodiment of the invention illustrated in detail in FIG. 4, the generally cylindrical openwork lattice rim 85 is composed of expanded metal, providing thin interconnected metal strips which are angularly bent between staggered rows of connections. As shown in FIG. 4 said strips and connections extending generally radially and circumferentially between the outer edges of said annular ring portions 88, between which edge portions the foraminous expanded metal sheet is suspended. Thus the self-conforming overlapping rows of relatively narrow generally diagonally disposed interconnected thin metal strip portions 91 will cooperate with the crown of an engaged rubber tire to define relatively large generally diamond shaped openings 92 that are elongated in a direction circumferentially of the rim 85. With reference to FIGS. 1 and 4, it will be seen that the rim 85 is formed to provide a concave periphery that corresponds generally to the convex periphery of the ground-engaging surface of the cooperating tire 14. The opposite side edge portions of the rim 85 are welded to the adjacent ring portions of the side flanges 84, the rim 85 and shaft 38 being the only connecting elements between the flanges 84, whereby to define an unobstructed annular interior of the drive wheel 38.

The stop bar 57 is so positioned relative to the mounting arm 41 that, when the piston rod 19 is moved rearwardly to cause raising of the frame 1 and parts carried thereby, the tire 14 underlying the drive wheel 37 will be moved out of driving engagement with the drive wheel 37. Upon movement of the piston rod 19 in a forward direction to cause lowering of the frame 1 and parts carried thereby, whereby to engage the ground with the harrow disks 11, the drive wheel 37 moves into operative engagement with the tire 14, whereby forward movement of the harrow will cause rotation to be imparted to the rotor shaft 24 of the auxiliary implement 22.

During movement of the harrow through a field, the relatively narrow interconnected portions 91 of the rim 85 firmly grip the road-engaging crown surface of the tire, whereby substantial driving traction is achieved for imparting rotary movement to the shaft 24 of the auxiliary implement 22. Under operating conditions wherein a substantial moisture content exists in the ground traversed by the harrow, the earth tends to adhere to the tire 14 and is carried thereby into engagement with the drive wheel 37. The relatively narrow interconnected portions 91 cut through the moist earth, breaking the same in clods which enter the interior of the wheel 37 through the relatively large openings 92, from whence the clods are disposed axially outwardly from the rotating wheel 37 through the segmental openings 89 in the side flanges 84. Thus, driving traction is maintained between the tire 14 and the drive wheel 37 under the most severe moisture conditions, and failure of operation of the auxiliary equipment or apparatus is effectively prevented. Moreover, I have found that, by elongating the openings 92 in a direction circumferentially of the drive wheel 37, better traction is obtained between the tire 14 and the drive wheel 37 then when said openings 92 are elongated in a direction axially of the wheel 37.

With reference particularly to FIG. 4, it will be noted that the peripheral or ring portions 88 of the flanges 84 are laterally spaced apart a sufficient distance to enable the ring portions 88 to be disposed in laterally outwardly spaced relation to opposite side edges of the road or ground engaging crown surface of the tire 14, when the drive wheel 37 is in driving engagement therewith. With this arrangement, clods or clumps of moist earth on the tire 14 pass freely through the openings 92 without coming into contact with the ring portions 88 where they might otherwise adhere to said ring portions 88 and cause a build-up of material thereon.

My invention has been thoroughly tested and found to be completely satisfactory for the accomplishment of the objectives set forth; and while I have shown and described a commercial embodiment of my drive mechanism, it will be understood that the same is capable of modification without departure from the spirit and scope of the invention, as defined in the claims.

What I claim is:

1. In a drive mechanism for rotary elements associated with an implement having a pneumatic tire equipped supporting wheel operatively associated therewith and bodily movable relative thereto,
    (a) a drive wheel adapted to tangentially engage the convex peripheral ground-engaging surface of the tire of said supporting wheel,
    (b) support means adapted to be mounted on said implement and including a rotary shaft mounting said drive wheel for rotation on an axis parallel to the axis of said supporting wheel and for bodily movements relative to said supporting wheel toward and away from said tangential engagement with said tire independently of the movement of said supporting wheel,
    (c) yielding means connected to said support means urging said drive wheel toward engagement thereof with said tire,
    (d) stop means connected to said support means for limiting independent movement of said drive wheel toward said tire,
    (e) and driving connections between said drive wheel and a rotary element to be driven and including said rotary shaft,
    (f) said drive wheel comprising a pair of axially spaced ring flange members and a generally cylindrical rim,
    (g) said ring flange members each having a hub portion and a plurality of widely spaced radial supporting spoke portions,
    (h) said rim being suspended between and secured adjacent its opposite edges to said ring flange members and having a concave periphery substantially conforming to the convex periphery of said tire,
    (i) said rim having relatively narrow generally diagonally disposed inter-connecting thin strip portions defining relatively large generally diamond-shaped radial openings to the interior of the drive wheel,
    (j) said openings being elongated in a direction circumferentially of the drive wheel.

2. The structure defined in claim 1 in which said support means comprises,
    (a) a mounting arm having said rotary shaft journalled at one end portion thereof,
    (b) and means for pivotally mounting said arm at its other end portion on said implement for swinging movements on an axis parallel to the axes of said supporting and drive wheels,
    (c) said stop means being mounted on said arm and engageable with a portion of said implement to limit movement of said drive wheel toward said supporting wheel and being adjustable to vary the limit of said movement of the drive wheel toward said supporting wheel.

3. A power take off wheel for contact with a tire, said wheel comprising a pair of spaced spider elements and a plurality of bars connected to said elements to define a wheel rim, said bars being concavely curved at their radially outer surfaces for contact with a tire of similar convex curvature.

4. In a drive mechanism for rotary elements of an implement having a pneumatic tire equipped supporting wheel operatively associated therewith and bodily movable relative thereto,
(a) a drive wheel adapted to tangentially engage the convex peripheral ground-engaging surface of the tire of said supporting wheel,
(b) support means adapted to be mounted on said implement and including a rotary shaft mounting said drive wheel for rotation on an axis parallel to the axis of said supporting wheel and for bodily movements relative to said supporting wheel toward and away from said tangential engagement with said tire independently of the movement of said supporting wheel,
(c) yielding means connected to said support means urging said drive wheel toward engagement thereof with said tire,
(d) stop means connected to said support means for limiting independent movement of said drive wheel toward said tire,
(e) and driving connections between said drive wheel and a rotary element to be driven and including said rotary shaft.

References Cited by the Examiner
UNITED STATES PATENTS

| | | | |
|---|---|---|---|
| 1,132,725 | 3/15 | Lally | 74—14 |
| 2,861,643 | 11/58 | Wald et al. | 74—213 |
| 2,904,224 | 9/59 | Young | 180—53 |
| 2,954,836 | 10/60 | Cavanaugh | 180—74 |

DON A. WAITE, *Primary Examiner.*

BROUGHTON G. DURHAM, MILTON KAUFMAN,
*Examiners.*